May 29, 1962 E. W. PUGHE, JR., ET AL 3,036,772
ANALOG-DIGITAL SIMULATOR
Filed Aug. 5, 1958 15 Sheets-Sheet 3

INVENTORS
EARLE W. PUGHE, JR.
MARK E. CONNELLY
BY
Lawrence S. Epstein
ATTORNEYS

May 29, 1962  E. W. PUGHE, JR., ET AL  3,036,772
ANALOG-DIGITAL SIMULATOR
Filed Aug. 5, 1958  15 Sheets-Sheet 5

INVENTORS
EARLE W. PUGHE, JR
MARK E. CONNELLY
BY
Lawrence S. Epstein
ATTORNEYS

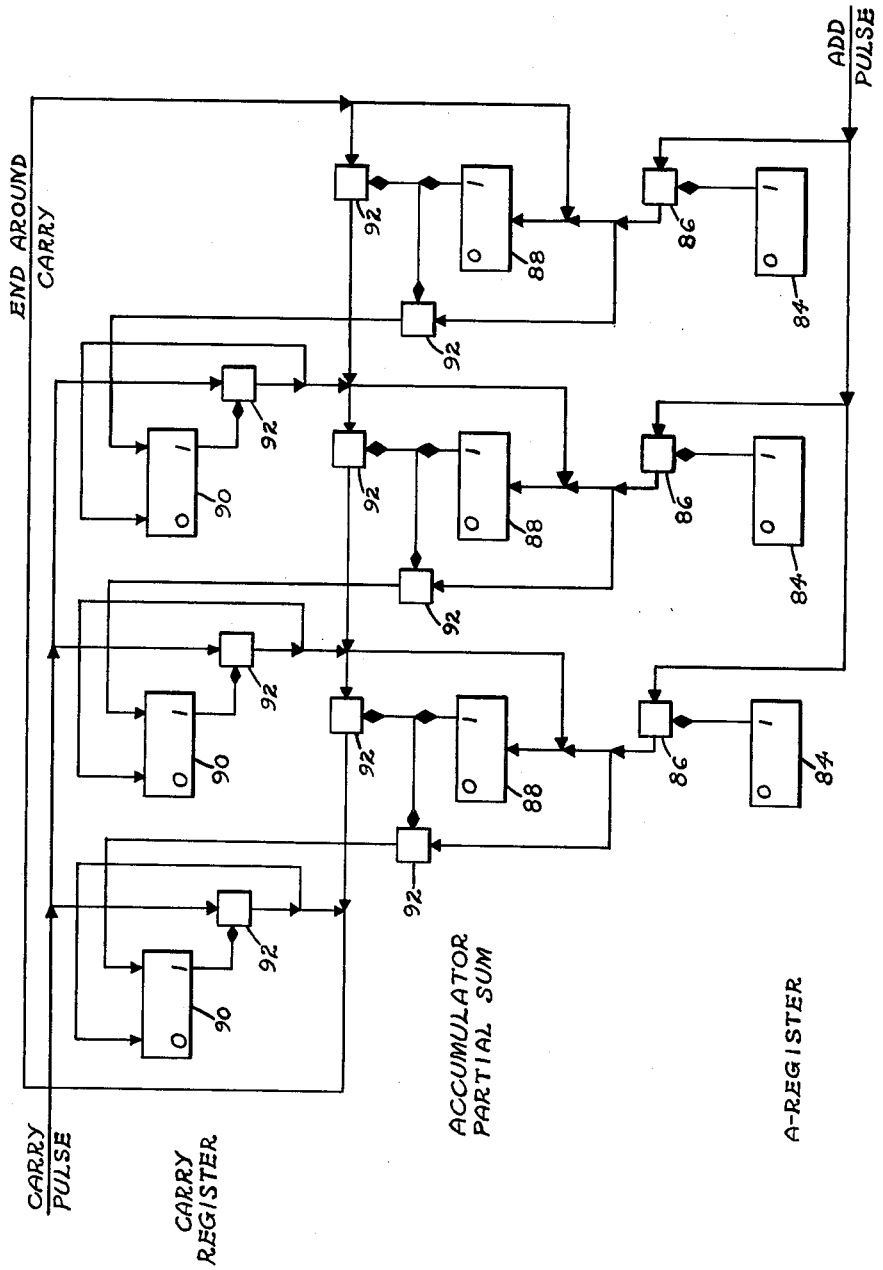

May 29, 1962 E. W. PUGHE, JR., ET AL 3,036,772
ANALOG-DIGITAL SIMULATOR
Filed Aug. 5, 1958 15 Sheets-Sheet 14
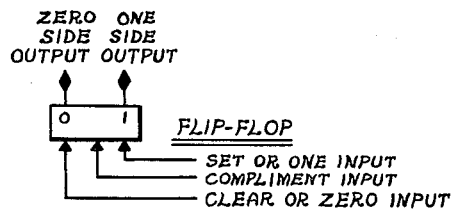
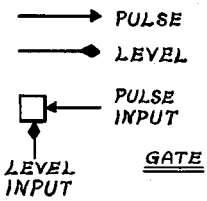
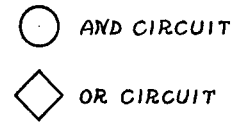
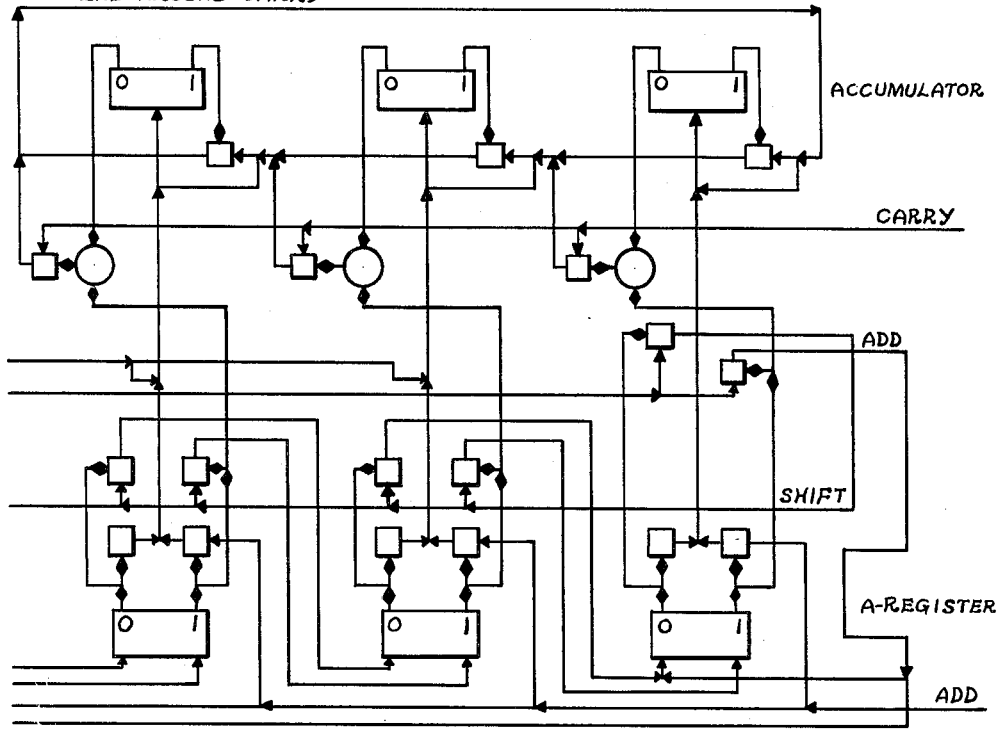
FIG. 12d
INVENTORS
EARLE W. PUGHE, JR.
BY MARK E. CONNELLY
Lawrence S. Epstein
ATTORNEYS

| United States Patent Office | 3,036,772 |
|---|---|
| | Patented May 29, 1962 |

3,036,772
ANALOG-DIGITAL SIMULATOR
Earle W. Pughe, Jr., Natick, and Mark E. Connelly, Concord, Mass., assignors, by mesne assignments, to the United States of America as represented by the Secretary of the Navy
Filed Aug. 5, 1958, Ser. No. 753,399
2 Claims. (Cl. 235—154)

This invention relates generally to computers and more specifically to digital computers for use in operational flight trainers.

In the study and evaluation of complex non-linear physical systems such as an airplane, it is desirable to have a computer simulate the system of interest so that data can easily and safely be obtained on a variety of designs. The computer should operate in real time because it may be necessary to use equipment from the actual system under study. For many training purposes, such as pilot training, it is desirable to have a computer simulate the system of interest so that the use of the equipment may be taught without jeopardizing the trainee or the equipment, and without regard to the time of day or the weather conditions. Training simulation must be in real time because of the presence of the human operator. In the gathering of technical data and the training of operators, the simulation computer should be inherently flexible enough so that it is a simple matter to alter the parameters of the system being simulated or to change systems completely. Also the computer must be fast enough to do real time simulation and it must have sufficient precision to give accurate and smooth outputs.

The instant invention therefore is the logical design of a flexible computer suitable for real time simulation of complex non-linear physical systems. The successful operation of this invention is not predicted on hypothetical advances in the state of the art, but is based on well established components.

As a specific guide for the instant invention, the computational requirements of an operational flight trainer have been used. Such a computer must solve the equations of motion for a specific aircraft over the entire range of flight conditions and give realistic outputs for instrument readings in the cockpit. The operational flight trainer was selected because it represents one of the most difficult simulation problems.

In the prior art several alternative techniques are suitable for real time simulation. Most frequently employed for both technical simulation and operational flight trainers are analog computers. Another method is to use an all-digital computer, but this approach has not been tested yet on a complex real time problem. And still another method is to use digital differential analyzer integrators in much the same fashion that analog integrators are employed in an analog computer.

Present day analog flight simulators do solve the equations of motion for a specific aircraft in real-time, but these analog simulators have certain inherent limitations. One such limitation is the difficulty of changing the simulation setup from one aircraft to another. In general such a change involves expensive equipment revisions. In fact, the revisions are so expensive that for operational flight trainers, the usual approach is to design and build a completely new trainer for each new aircraft. Even for a given aircraft it is difficult in an analog simulator to change the values of the functions describing the aircraft flight characteristics. Frequent changes in this aerodynamic data are the rule rather than the exception.

The generation of arbitrary functions of two or more variables using analog techniques is one of the most difficult problems in simulators such as an operational flight trainer. The present techniques for function generation i.e., potentiometers, photoformers, and diode function generators are difficult to set up and are not readily adaptable to functions of two or more variables. When a large number of non-linear functions are required, the amount of equipment becomes cumbersome, since each function requires its own special apparatus. This problem of function generation is greatly simplified in the instant invention.

Accuracy limitations are another important shortcoming of analog computers: one-tenth of one percent static accuracy is the present practical limit for the individual elements and even this accuracy is difficult to maintain over an extended period of time under varying conditions of temperature and humidity. This accuracy is further degraded by dynamic simulation and by cumulative errors. One-tenth of one percent accuracy is digitally represented by about ten binary bits, an accuracy easily accomplished with the instant invention. Thus, as more accurate solutions are required for complex physical systems, analog techniques become marginal. Also the speed of response of analog computers is limited by the servomechanisms employed in multiplication and integration.

An all-digital system has been developed by the University of Pennsylvania and is known as the "Universal Digital Operational Flight Trainer." This system which has not been extensively tested will probably overcome many of the attendant disadvantages of the corresponding analog systems.

The last alternative to real-time simulation is to employ digital differential analyzer components connected in essentially the same manner analog components are connected in an analog machine: namely, a separate component for each mathematical operation. Obviously this scheme has to be as inflexible as the corresponding analog system.

In the instant invention, certain inventive features have been incorporated. These features are: The ability to generate arbitrary non-linear functions of two variables given only the values of the functions at discrete points; it is not necessary to determine an analytic expression for the function by curve fitting or other techniques; this function generation ability was obtained by incorporating a special interpolate order which determines the values of a two variable function. The second feature is the incorporation of a second accumulator which automatically sums the results of intermediate computations performed by the main accumulator; this use of a second accumulator reduces the number of references to memory and hence the time consumed by about 40%. The third feature is the inclusion of high-speed floating point arithmetic which reduces the programmer's burden because of the extremely large range of numbers that may be handled with full precision without scaling and greatly reduces computation time. Another important inventive feature is the ability to perform computations in both the analog and digital domain under the control of the digital system to thus use the best computational features of both the analog and digital computers.

An important object of the instant invention to provide a high speed analog-digital computer.

Still another object of the invention is to provide an analog-digital computer for use as an operational flight trainer.

Still another object of the instant invention is to provide a system and method for generating arbitrary non-linear functions of two variables given only the values of the functions at discrete points.

Another object is to provide a computer wherein function generation is obtained by the incorporation of a special interpolate order.

Another object of the instant invention is to provide a computer wherein a second accumulator automatically sums the results of intermediate computations performed by a main accumulator to speed up computing.

Yet another object of the instant invention is to provide a computer wherein high-speed floating point arithmetic is incorporated.

Yet another object of the invention is to provide a computer wherein the need for scaling is greatly diminished, thus reducing the computation time.

Still another object of the invention is to provide a computer having the ability to perform computations in both the analog and digital domains under the control of the digital system.

Another object of the invention is to provide a computer which is easy to program.

Yet another object of the instant invention is to provide a real-time analog digital simulator which may be easily changed from one system to another by simply feeding in a tape containing the program and parameters describing a new system.

Other objects and many of the attendant advantages of this invention will be readily appreciated as the same becomes better understood by reference to the following detailed description when considered in connection with the accompanying drawings wherein:

FIG. 10 depicts addition logic without carry storage,

Figure 11A:
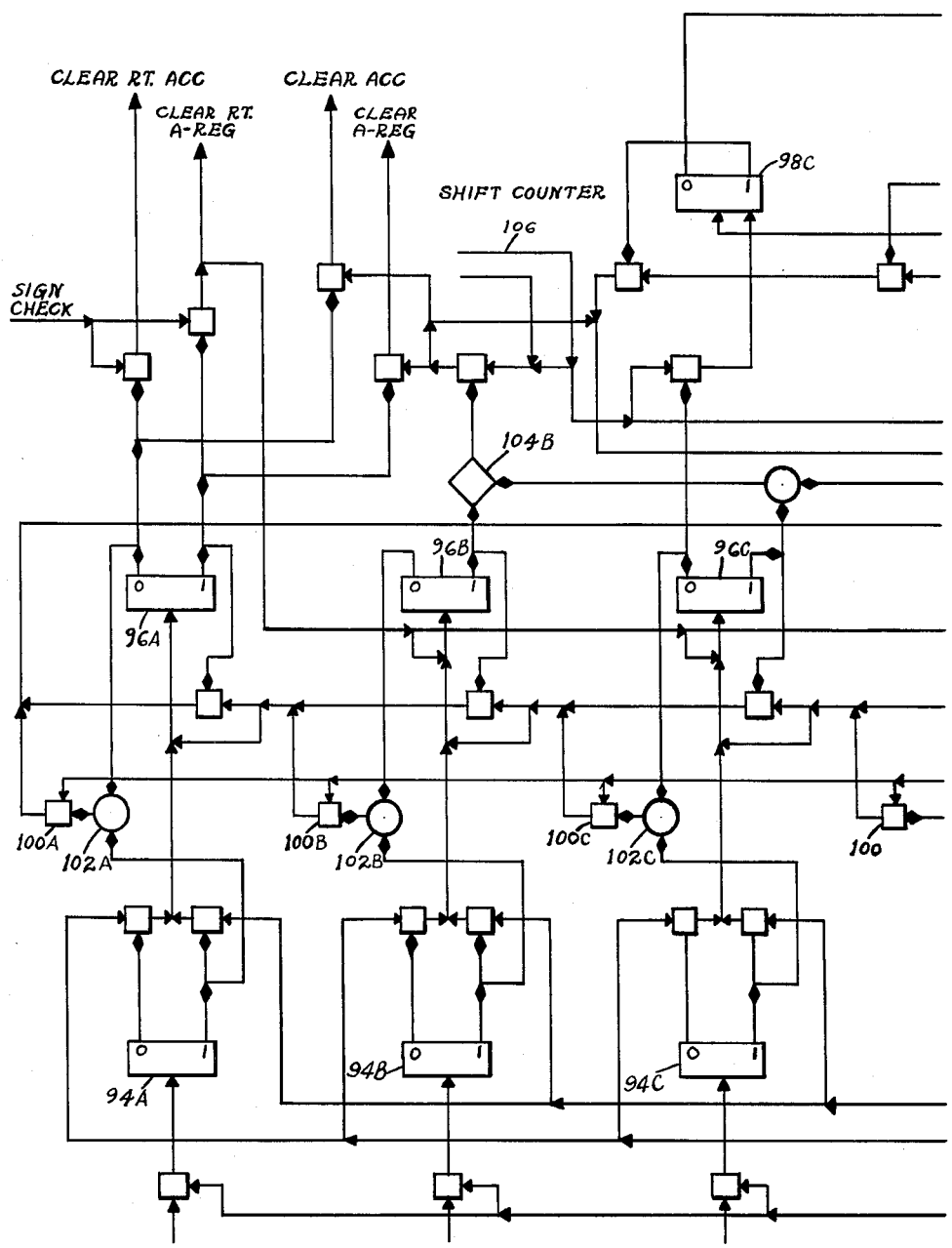
Figure 11B:
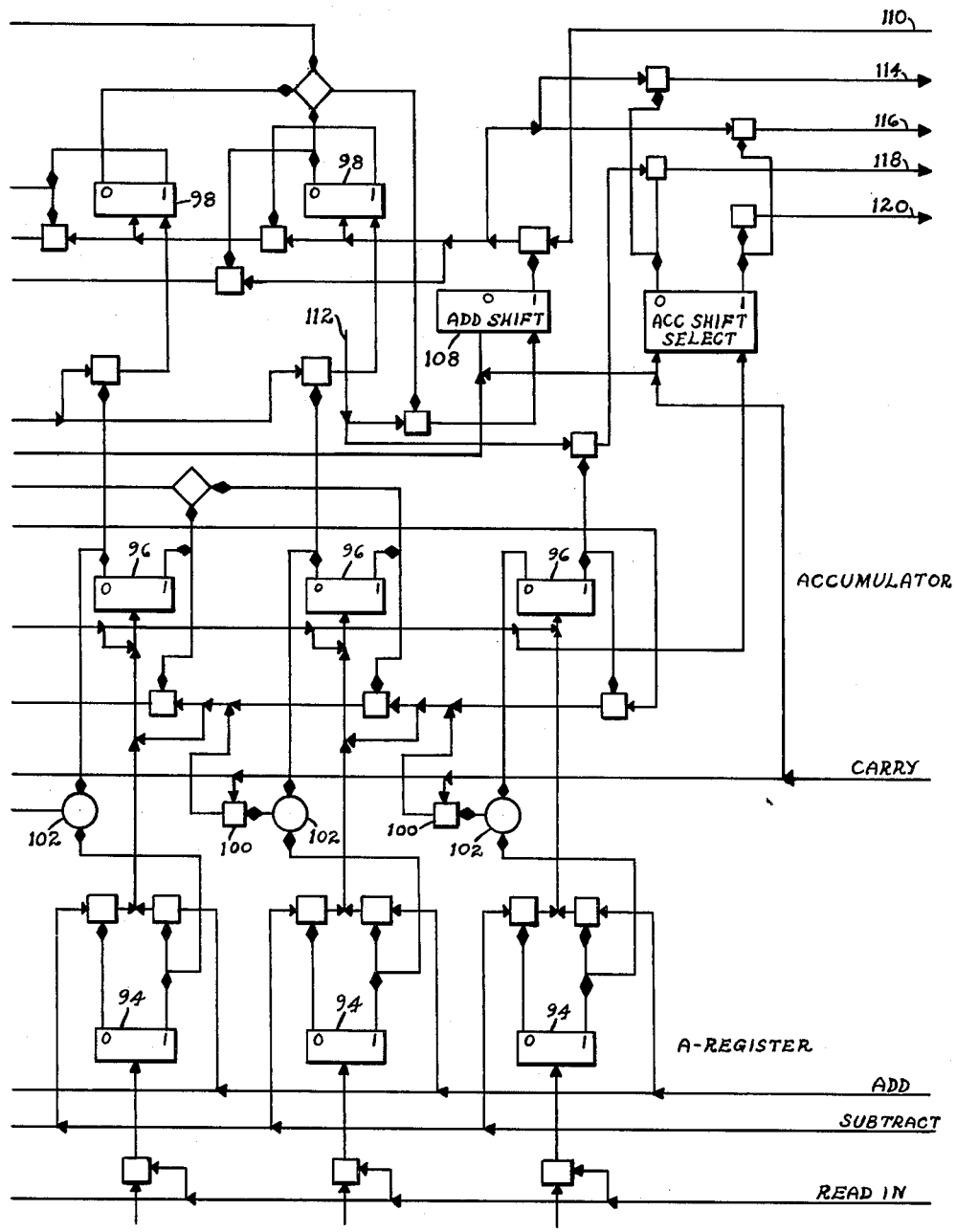
Figure 12A:
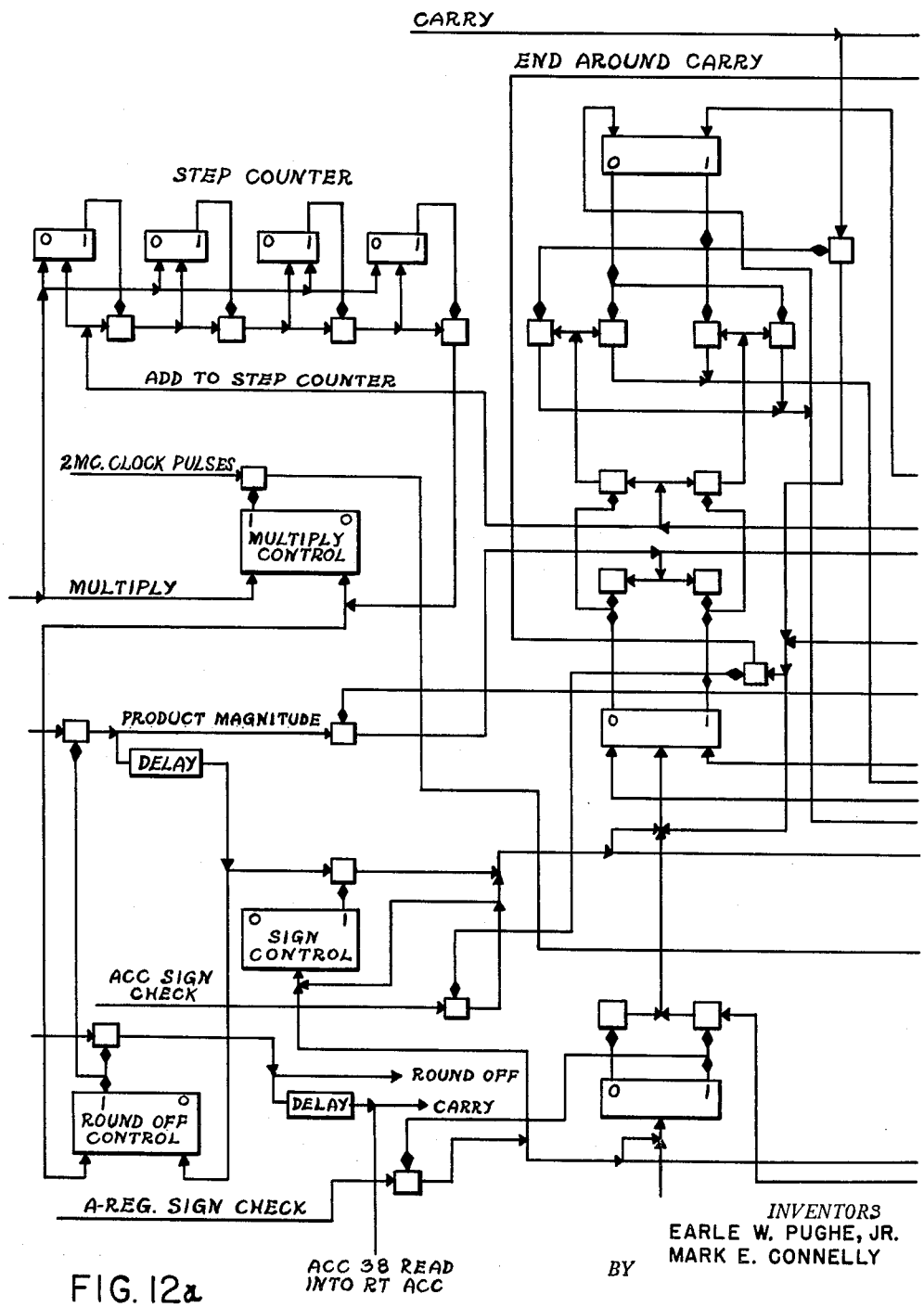
Figure 12B:
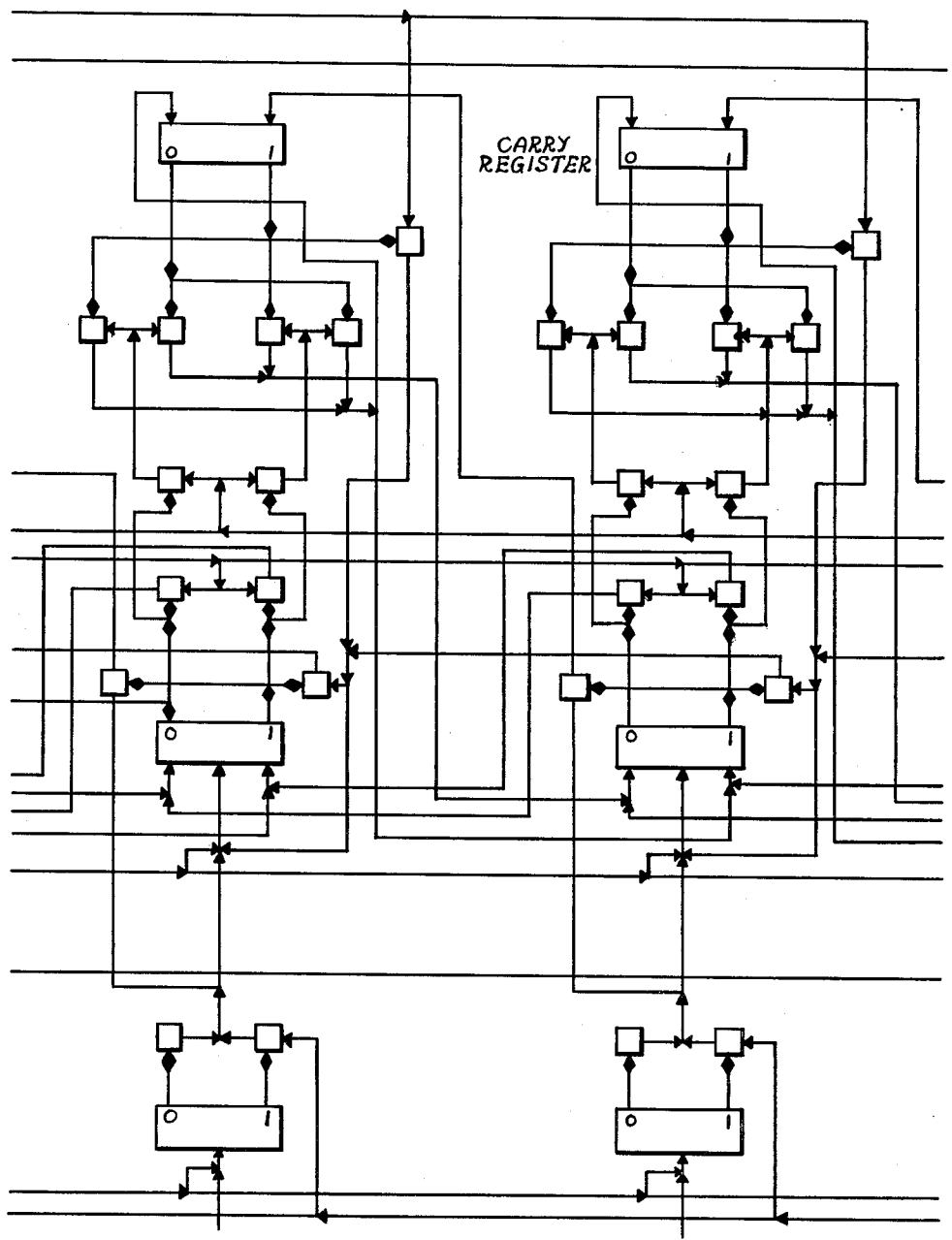
Figure 12C:
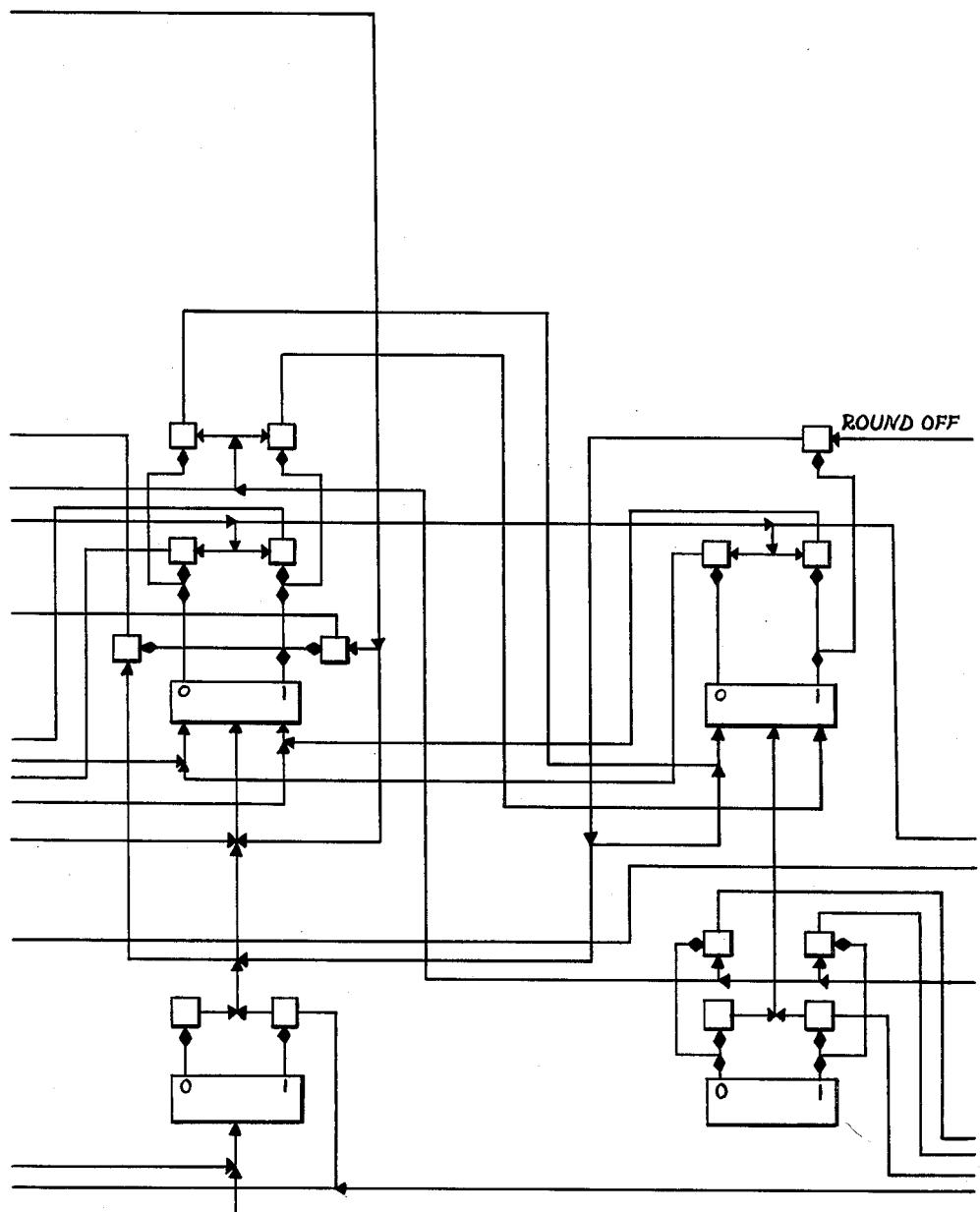
Figure 13:
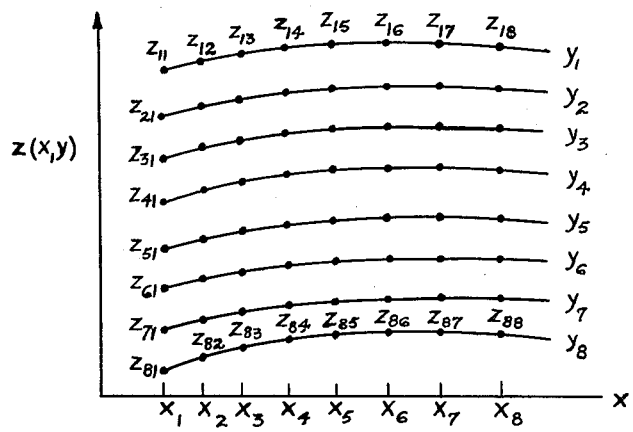
Figure 14:
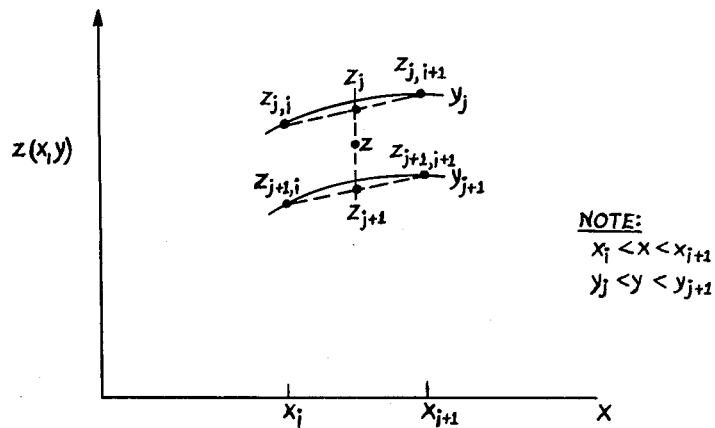

FIG. 11 comprising FIGURES 11a and 11b, shows the inventive add order exponent control logic, FIG. 12 comprising FIGURES 12a to 12d illustrates the main accumulator multiply logic of the instant invention, FIG. 13 shows a typical function of two variables, FIG. 14 illustrates the linear interpolation technique used in function generation, The instant invention is designed to make the man-machine relationship as convenient as possible. The system does not have self-sufficient analog and digital sections with their interaction controlled by a third piece of equipment. Rather, the instant invention is an integrated system wherein the control necessary for the digital domain controls the whole system. Operations which are most easily done by digital means are done in the digital domain. Operations which are most easily done by analog techniques are done in the analog domain.

Figure 1:
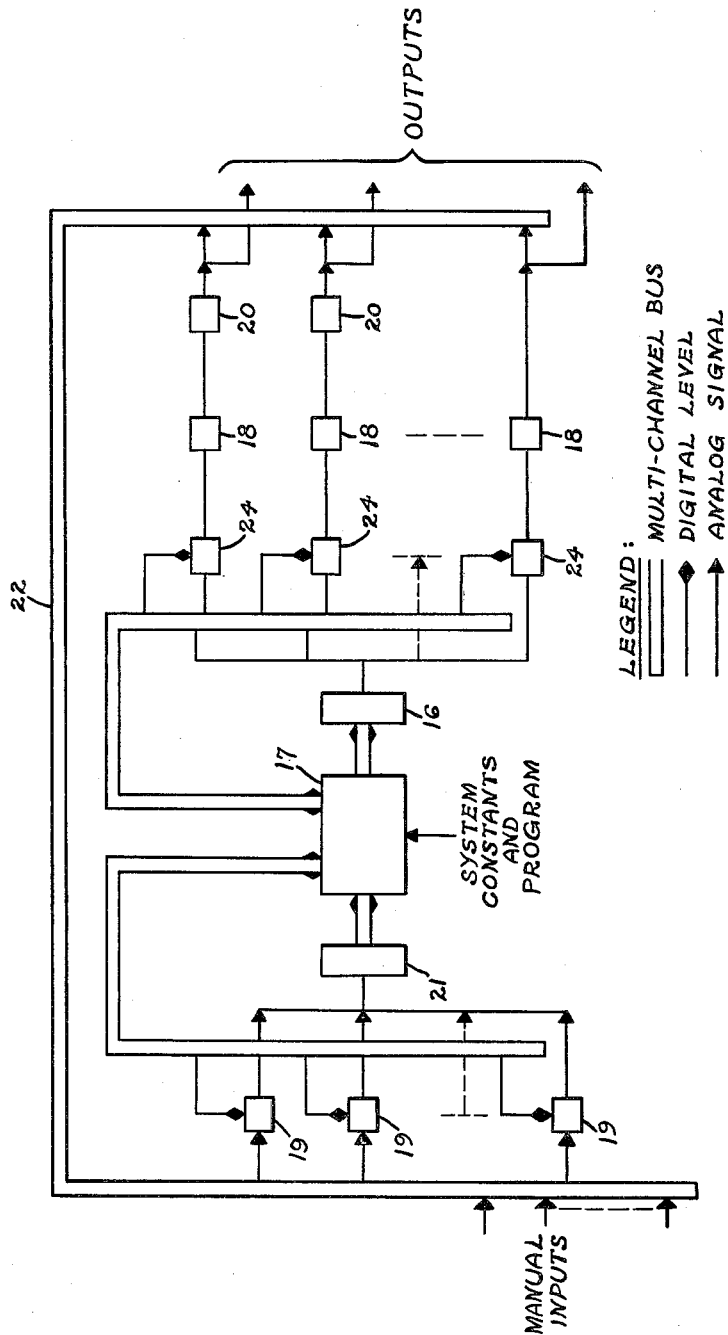
FIG. 1 depicts the block diagram of the instant inventive simulator system.

Referring to FIG. 1 the organizational arrangement of the invention is shown. A multi-channel bus 22 has connected thereto gate circuits 19. A special purpose digital computer 17 connects to the gate circuits 19 through an encoding device 21. Connected to the output of the special purpose digital computer 17 is a decoding device 16. Decoding device 16 is then coupled to gate circuits 24, each gate circuit having respectively coupled thereto storage device 18. Typical coding and decoding devices are shown in Patent Nos. 2,713,456 and 2,941,196. In its preferred form, the storage device 18 is merely a capacitor. Analog integrating devices 20 are coupled to the storage devices 18 and receive the data stored therein. The aforementioned multi-channel bus 22 is coupled to the outputs of integrators 20. Typical integrators are shown in Patent Nos. 2,733,391 and 2,919,065.

With the instant invention it is also possible to connect between the output and input of the system a special purpose analog computer to perform miscellaneous operations.

The special purpose digital computer 17 controls the complete system. When the digital computer 17 needs the present value of one of the input variables, e.g., rudder deflection for computation purposes, the computer will actuate the input system. This control of the input system will be effected by having the digital computer input control matrix open the proper gate 19, putting the analog voltage corresponding to the desired input into the analog-digital encoder 21. The digital output of the encoder 21 will be placed in the digital computer input buffer register (30, FIG. 2), from whence the information can be used as desired. When the computer has finished the calculation of the desired function, the number is placed in the digital computer output buffer register (48, FIG. 2) which actuates the digital-analog decoder 16. The computer output matrix opens the proper gate 24 to the storage device 18 which stores the analog result on a capacitor. When it is necessary to integrate, e.g. in an OFT (operational flight trainer) to get roll rate from roll acceleration, the stored quantity is permanently connected to the integrator 20. Since some outputs are required in the digital computation, the system has a multi-channel feedback bus. This bus is the multi-channel bus 22. These feedback quantities are encoded in exactly the same fashion as the independent input variables.

Figure 2:
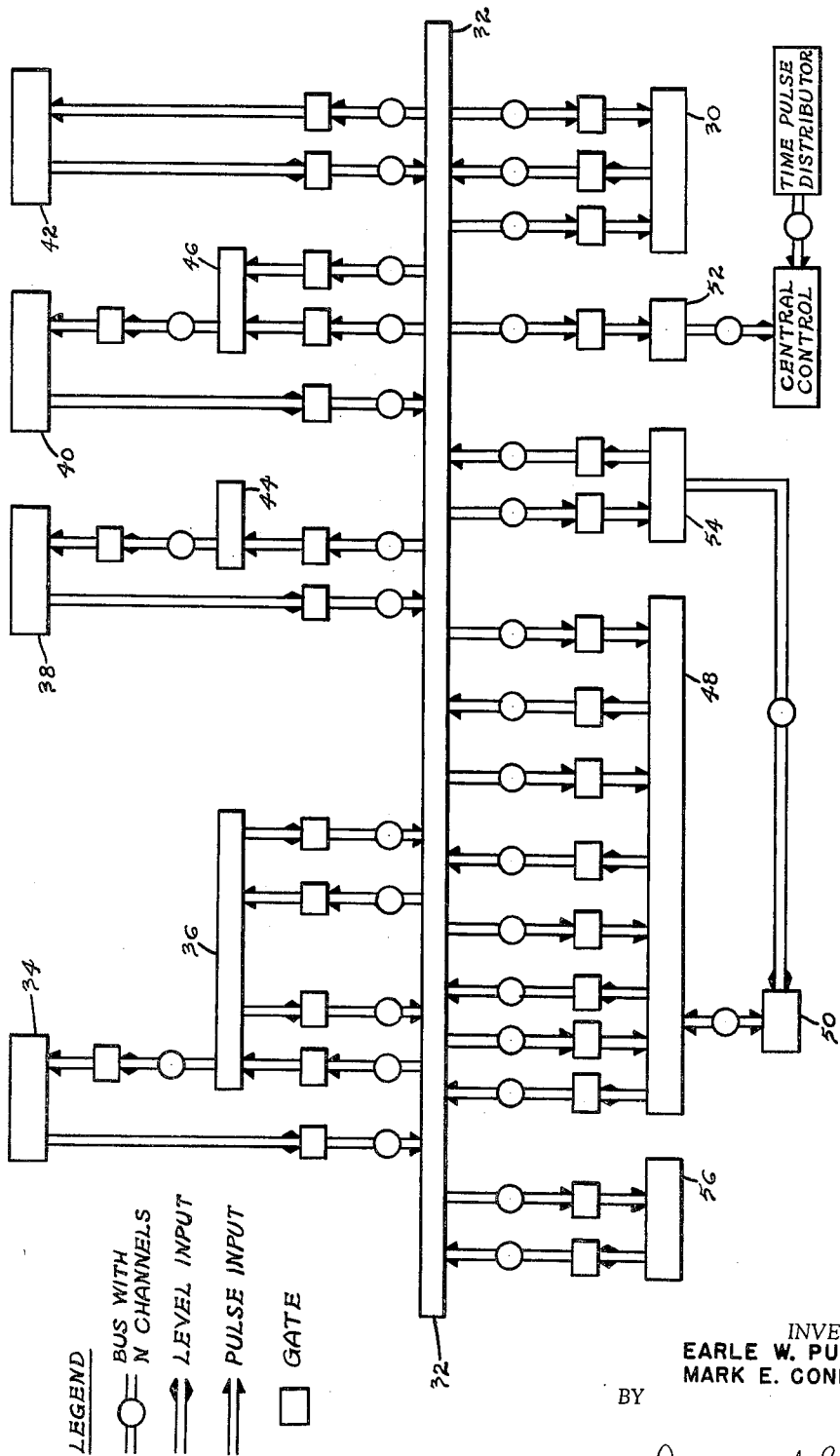
FIG. 2 shows the digital computer used in the simulator system.

The special purpose digital computer 17 referred to in FIG. 1 is a synchronous machine with parallel transfer of information via a main bus 32. This computer is depicted in FIG. 2. The arrangement of the computer is such that it is convenient for adding new orders or changing present ones. In its preferred form, the computer uses a single address code since the storage of the results of each individual arithmetic operation is not desired. Also the binary number system is used because the component parts such as cores and flip-flops are binary by nature.

Referring to FIG. 2 the main bus 32 connections of the digital computer 17 are shown. A main accumulator 34 is operable with an A-register 36 and together constitute the main arithmetic element. Storage devices 38 and 40 are provided with associated A-registers 44 and 46 respectively and operate off the main bus 32. These storage devices 38 and 40 are special purpose arithmetic elements and are used to facilitate rapid interpolation and floating point computation. This will be described fully later. The register 42 also operating off the main bus 32 is a temporary high-speed storage register. A memory buffer register 48 also operates off the main bus and stores the word being read into or out of the magnetic core memory 50. The memory size is determined by the number of words that must be stored and the number of bits required in a word. For the flight equations of motion the analog-digital simulator must be able to generate 22 functions of two variables and to store a program of 1200 orders. Each function of two variables requires $16 \times 16 \times 22 = 5632$ storage positions. Each value is known to only nine bits and therefore two function values may be stored per register if the word length is 18 bits or more. Thus $$5632/2 + 1200 = 4016$$

registers are required. As the digital system is binary, a memory having $2^{12} = 4096$ registers is used. With numbers of nine bit accuracy, it is desirable to store intermediate results to eleven bits. To maintain symmetry and thus simplify any future logical operations, the memory has $2 \times 11 = 22$ bit word length.

Connected off the main bus 32 is a control switch 52 which decodes the order part of an instruction from the magnetic core of memory 50. A memory address register 54 operating off the main bus controls the memory address. A program counter 56 is a register and contains the address of the order to be performed. This program counter 56 operates off the main bus and has its contents normally increased by 1 each time an order is performed so that orders are taken from successive registers in the memory 50. Finally, input-output registers 30, operating off the main bus, temporarily hold information being brought into or out of the digital computer. This register 30 is nothing more than a buffer register.

When executing an order two major steps are required: (1) obtaining the order from memory, called program timing (PT) and (2) the actual execution of the order, called operation timing (OT).

Operation timing takes the address contained in the program counter and places it in the memory address register 54. The contents of the corresponding memory register are placed in the memory buffer register 48. A number of left hand bits of a word are read (via the main bus 32) into the control switch 52, and the remaining right hand bits of the word are read into the memory address register 54. The left hand bits are the order part of an instruction. The control switch 52 decodes the order and the memory address register 54 selects the contents of the register on which the order is to perform. During the next operation timing cycle the contents of the program counter 56 are indexed by one and the whole procedure is started over again. Thus, operation timing is followed by program timing which in turn is followed by operation timing of the next order.

Figure 3:
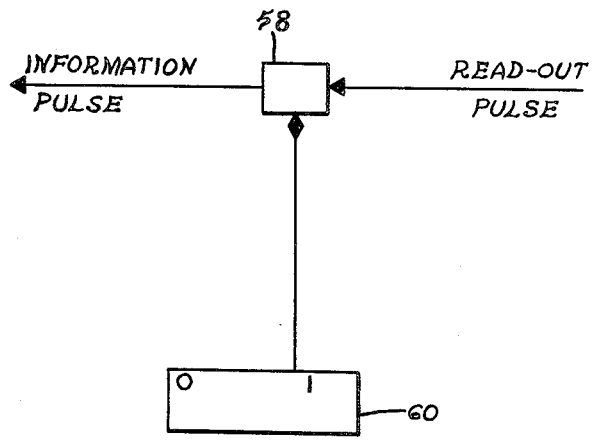
FIG. 3 shows a typical digital read out circuit.

In the digital computer 17 (exclusive of memory) all information is stored in flip-flop registers and all information is transferred between registers as pulses. The read-out scheme is shown in FIG. 3 wherein 58 designates a gate tube and 60 designates a flip-flop having two stable states: One and Zero. Each bit of information in a register requires a flip-flop to store it. If a bit is a Zero the flip-flop is in the Zero state, and if the bit is a One, the flip-flop is in the One state. Referring to FIG. 3, if the flip-flop is in the One state the gate is open and the read-out pulse gets through the gate as an information pulse. If the flip-flop is in the Zero state, the gate is closed and the read-out pulse is blocked. The presence of the pulse denotes a One and the absence of the pulse denotes a Zero.

Figure 4:
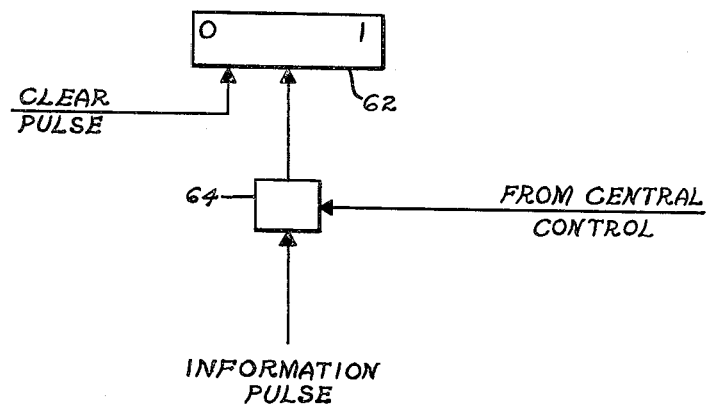
FIG. 4 shows a typical digital read in circuit.

The read-in method is shown in FIG. 4 and includes a flip-flop 62 and a gate tube 64. To read in, the register is first cleared, i.e., all the flip-flops are put in the Zero state. The read-in gate 64 is then opened by a level supplied from the central control and the information pulse goes through the gate tube 64 and complements the flip-flop 62 to the One state. The input can also be connected to the One input instead of the complement input. If the information pulse is not present, i.e., the bit is a Zero, the flip-flop remains on Zero. Since the transfer of information takes place via the main bus 32, the input gates 64 for several registers may be opened and the information placed in these several registers. It should be realized that the main bus 32 is actually composed of individual buses, one for each bit in a word.

Figure 5:
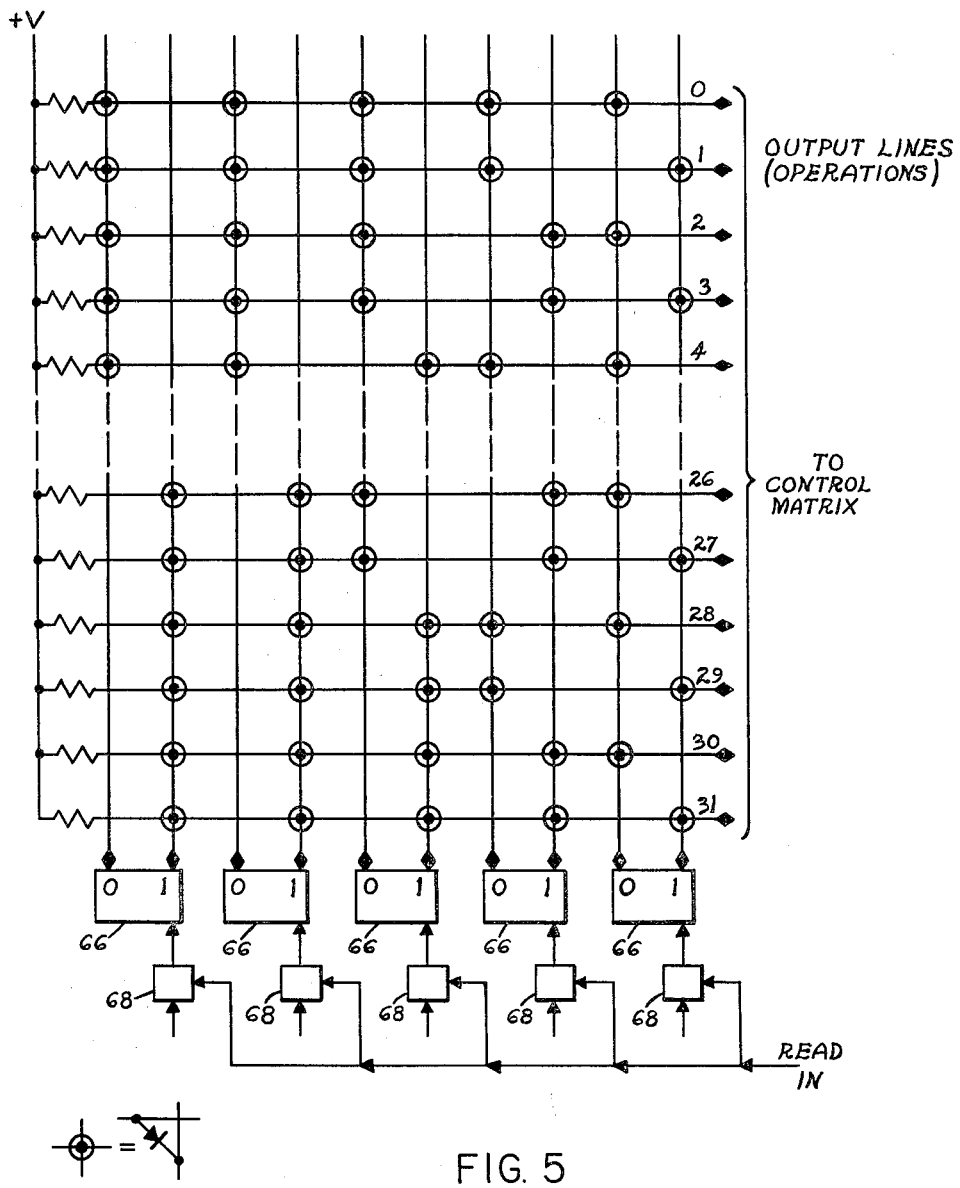
FIG. 5 shows the Control Switch used in digital computer.

The central control (FIG. 2) actuates the gates which allow the information to go out of a register onto the main bus 32 and into one or more other registers. When a word taken from memory is to be interpreted as an instruction, the left hand bits represent the operation to be performed. These operation bits are read into the control switch 52. FIG. 5 is a schematic of the control switch 52 wherein 66 designates a flip-flop and 68 designates a gate tube. The circled dot as indicated on FIG. 5 is an equivalent for a diode connection. The operation bits are stored in the flip-flops 66 which in turn energize, i.e., put at relative position potential, one and only one of the output lines. This output line corresponds to the order represented by the bits of the order code. For instance, if the bits denoting the add order are 00011, then when an add is to be performed the third, fourth and fifth flip-flops will be in the Zero state; i.e., the Zero side will be at relative high potential. Likewise the first and second flip-flop will be in the One state, i.e., the one-side will be at relative high potential and the Zero side at relative low potential. Thus, every output line except output line 3 of FIG. 5 will have at least one conducting diode connected to it. Line 3 will be the only output line at relative positive potential and so the control system is instructed to perform the add order corresponding to the order code 00011.

Figure 6:
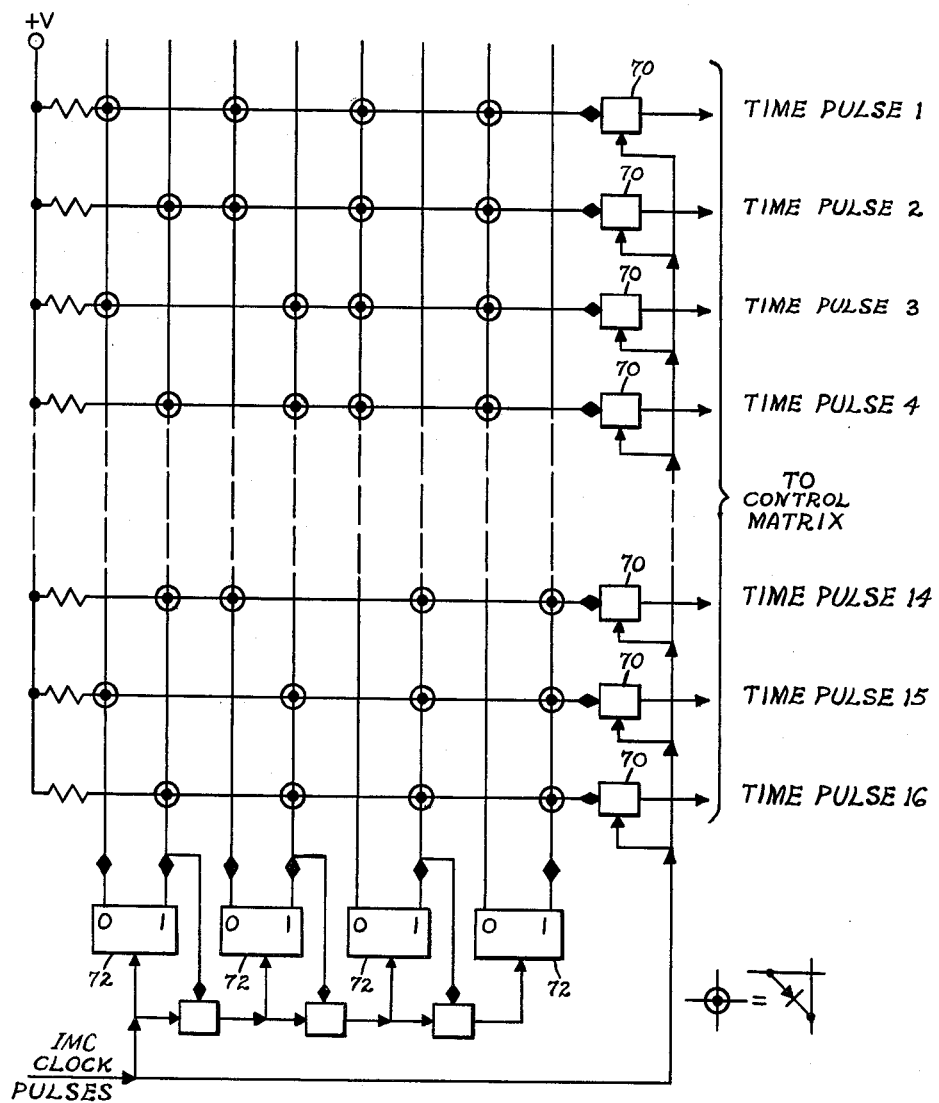
FIG. 6 shows the Time Pulse Distributor used in the digital computer.
Figure 7:
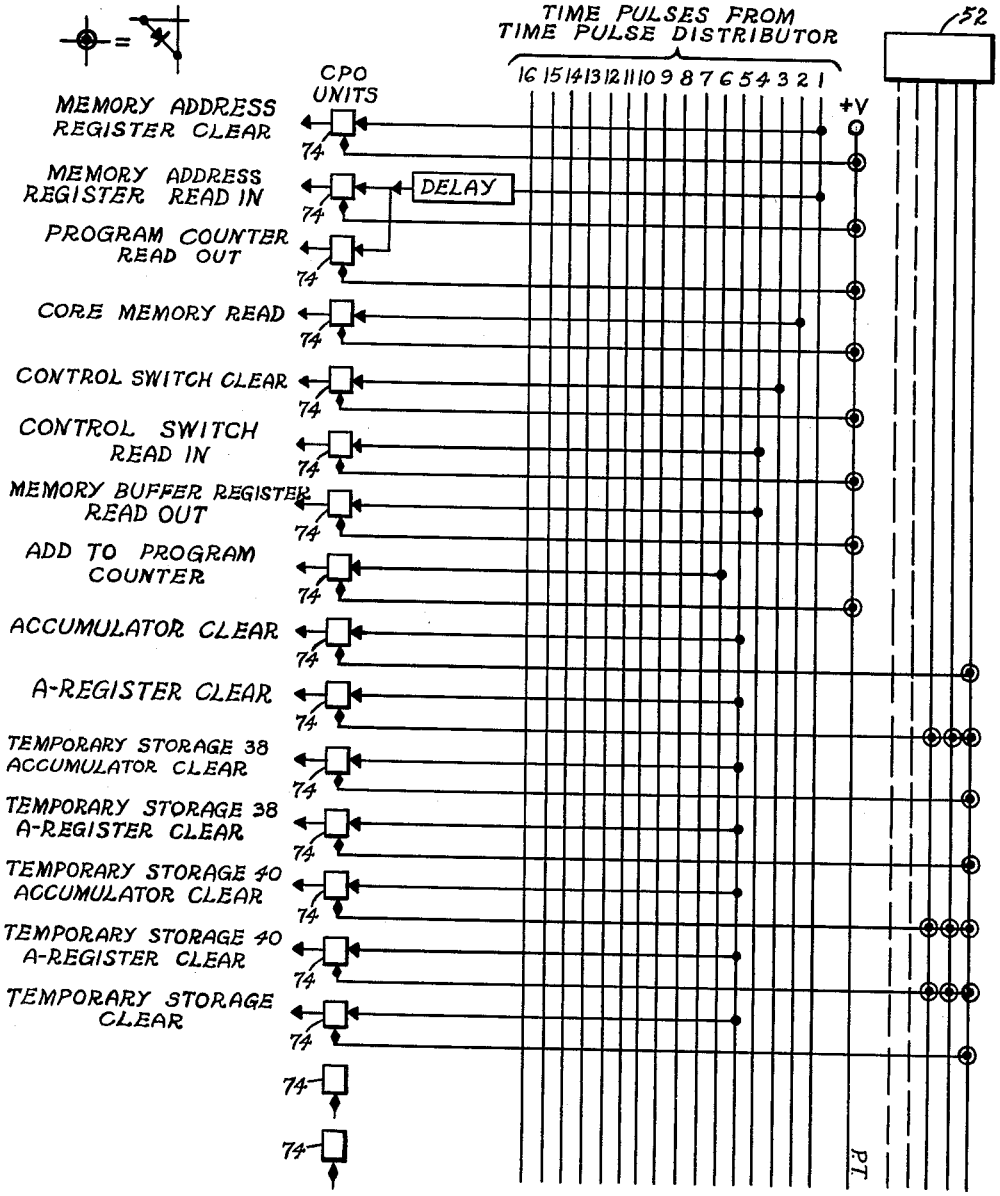
FIG. 7 depicts the control matrix of the digital computer.

The output lines of the control switch 52 are inputs to a control matrix. This control matrix is schematically depicted in FIG. 7. The control matrix also has inputs to it resulting from the time pulse distributor shown in FIG. 6. Referring to FIG. 6, the time pulse distributor is schematically shown wherein 70 designates a gate tube and 72 a flip-flop circuit. As noted on FIG. 6, a circled dot represents a diode connection. The time pulse distributor operates in exactly the same fashion as the control switch 52, but the four driving flip-flops 72 are connected together as a binary counter. Each time a clock pulse arrives, it goes through one of the output gates 70 as a numbered time pulse and then adds one to the binary counter, thus stepping the time pulse distributor to the next higher output line. The next clock pulse goes through the corresponding output gate 70 as the following numbered time pulse.

The outputs from the time pulse distributor and the control switch 52 are the inputs to the control matrix shown in FIG. 7. The control matrix comprises the central control referred to in FIG. 2. The numeral 74 designates a gate tube and a circled dot once again refers to a diode connection. Each instruction requires a number of steps in sequence and the control matrix supplies the command pulses to do these separate steps. As previously explained, each order must be taken from memory before it can be executed. Therefore, a program timing (PT) line is added. It is the function of the program timing line to enable the command pulse output units (CPO) to put out in sequence the necessary command pulses to bring an instruction from memory. For example, the program timing line actuates the first CPO unit. So, when time pulse one arrives the memory address register (MAR) is cleared. The first time pulse also causes the program counter contents to be read into the memory address register. Since the memory address register 54 must first be cleared, the first time pulse is delayed before going into the second and third CPO units.

There are two types of CPO units. The first type produces a pulse after a slight delay, and the second produces an output of longer duration than a normal pulse. The second type CPO unit is used for read-in. The long pulse is used to insure that the read-in gate is open when an information pulse arrives.

The main arithmetic element of the instant invention adds, subtracts, multiplies, divides, shifts, and complements. The orders which occur most frequently in the program are the add type: add (AD), subtract (SU), clear and transfer (CT), and add and transfer (AT); and the multiply (MU). Each order requires two memory cycles, one to get the order from memory and second to get the operand from memory. The add and multiply orders are designed to be completed in two memory cycles, thus making maximum possible use of a single memory.

The arithmetic element of the instant invention does floating point arithmetic. By performing floating point arithmetic, the problem of scale factoring has been obviated thus rendering the problem of simulating a wide range of variables a simple matter. The range of numbers that can be handled by a fixed point computer is limited. If the smallest number is to have $m$ bit accuracy and there are $m+n$ bits in a word, then the range that can be handled in a fixed point computer without scale factoring is $2^n$ while in a floating point computer the range is $2^{2^n}$. For example, using a 22 bit word length with 11 bit accuracy, a fixed point computer without scale factoring only has a variable range of 2048 to 1 while a floating point computer with the same 11 bit accuracy has a range of $2_2^{11}$ or approximately $10^{750}$. With such a tremendous range available, scale factoring will probably never be required for simulation. This scale factoring of a fixed point computer must be done both in the writing of the program and in the real time execution of the program. Since fixed point arithmetic elements usually have the radix point at one end of the word, scale factoring is also needed to accommodate either fractional values or integral values. With fixed point arithmetic, the word length must be sufficiently long to handle a large dynamic range, e.g. altitude 0 to 100,000 ft., while keeping a change in the least significant bit small in absolute magnitude. Thus, fixed point arithmetic requires more effort on the part of the program, a longer word length, and more real time to solve a given set of equations.

When two numbers $A \times 2^m$ and $B \times 2^n$ are added together using the floating point technique, the value of the exponents must be made equal. Assuming $m$ greater than $n$, it is necessary to increase $n$ until it equals $m$ and at the same time divide B by $2^{m-n}$. This is proven by the equation $$B \cdot 2^n = \frac{B}{2^{m-n}} \cdot 2^m \tag{1}$$

But division by 2 in the binary number system is the same as shifting the radix point one place to the left which in turn is the same as holding the radix point fixed and shifting the number one place to the right. Thus, shifting is a necessary part of the computer's abilities.

The shifting technique utilized in the instant invention is well known to the art and is best explained by reference to FIG. 8 wherein 76 refers to flip-flops and 78 to gate circuits.

To shift right one place, the shift line is pulsed. If a given flip-flop 76 is in the One state, the one-side gate is open and the shift pulse goes through and sets the next flip-flop to a One. Likewise, if the flip-flop is in the Zero state, the zero-side gate is open and the shift pulse puts the next flip-flop to a Zero. There is enough delay inherent in the gates and the inputs to the flip-flops to allow the sensing of one stage before the pulse from the previous stage arrives. To maintain accuracy the smaller number should be shifted right. If the larger number were shifted left, the most significant bits might be shifted out of the accumulator.

After two numbers have been shifted until they have the same exponent, the numbers are added. Adding two such numbers, A and B, requires two steps. The first step is the addition of corresponding bits in A and B. The second step consists in handling the carries generated in the first step. For a given bit of a parallel adder, the Proof Tables I and II apply. The partial sum ($P_s$) and the carry left ($C_L'$) of Table I are the result of the add pulse initiating the first step. The Boolean expressions and Table I are:

$$P_s = A\overline{B} + \overline{A}B \tag{2}$$

$$C_L' = AB = A\overline{P}_s \tag{3}$$

Table I

| A | B | $P_s$ | $C_L'$ |
|---|---|-------|--------|
| 0 | 0 | 0 | 0 |
| 0 | 1 | 1 | 0 |
| 1 | 0 | 1 | 0 |
| 1 | 1 | 0 | 1 |

Figure 9:
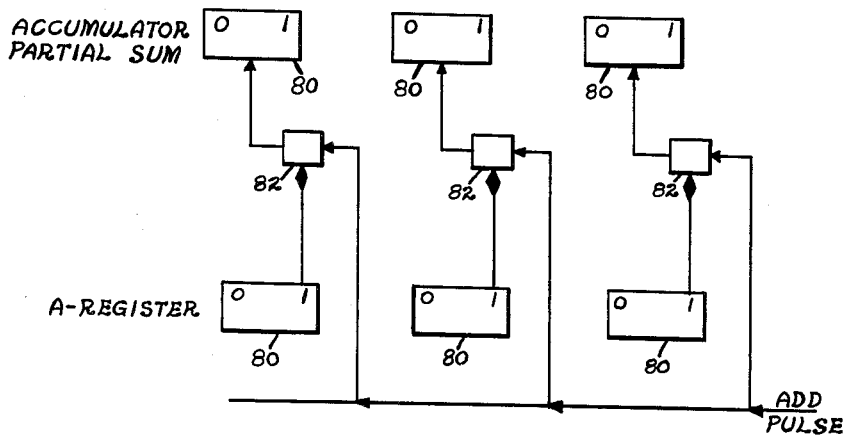
FIG. 9 illustrates typical partial sum logic.

FIG. 9 depicts a logical arrangement of a circuit which will implement the partial sum and store the result; reference numerals 80 and 82 respectively refer to flip-flop circuits and gate circuits. It can be seen from Table I that the partial sum in the accumulator is the complement of B when A is a One and equals B when A is a Zero. In FIG. 9 it is seen that the accumulator is complemented by the add pulse in those positions where the A-register contains a One.

After the partial sum $P_s$ is formed by the add pulse, a carry pulse is used to generate the carries and the total sum at $T_s$. In Table II, the carry left in the total sum are given for each possible value of A, $P_s$ and the carry from the right $C_R$. The Boolean expressions and Table II are.

$$T_s = \overline{P}_s C_r + P_s \overline{C}_r \tag{4}$$

$$C_L = A\overline{P}_s + P_s C_r = C_L' + P_s C_r \tag{5}$$

Table III

| A | $P_s$ | $C_r$ | $T_s$ | $C_L$ |
|---|-------|-------|-------|-------|
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 0 | 1 |
| 1 | 0 | 1 | 1 | 1 |
| 1 | 1 | 0 | 1 | 0 |
| 1 | 1 | 1 | 0 | 1 |

FIG. 10 is a further expansion of the logical circuit shown in FIG. 9 and is a logical circuit which will realize the above Boolean expressions. This logical design has the ability to store the carries generated by the add step in a separate carry register. The use of a separate carry register makes multiplication in the instant invention very fast as will be fully explained later.

Referring to FIG. 10, the logical addition circuit utilized in the instant invention is shown. Flip-flops 84 comprise the A-register and are operable through gate 86 with the accumulator flip-flops 88. Carries which are generated during the addition are stored in the carry register flip-flops 90. After pulsing with the carry pulse the total sum $T_s$ is produced by application of the stored carries in flip-flops 90 to the accumulator flip-flop 88. For a more detailed explanation of the operation of this circuit, refer to FIGURE 4-15 of the Richards book cited infra. The parts shown in this figure operate in an identical fashion to each order shown in FIGURE 10, i.e., the combination of parts 84, 86, 88, 90 and 92.

Figure 8:
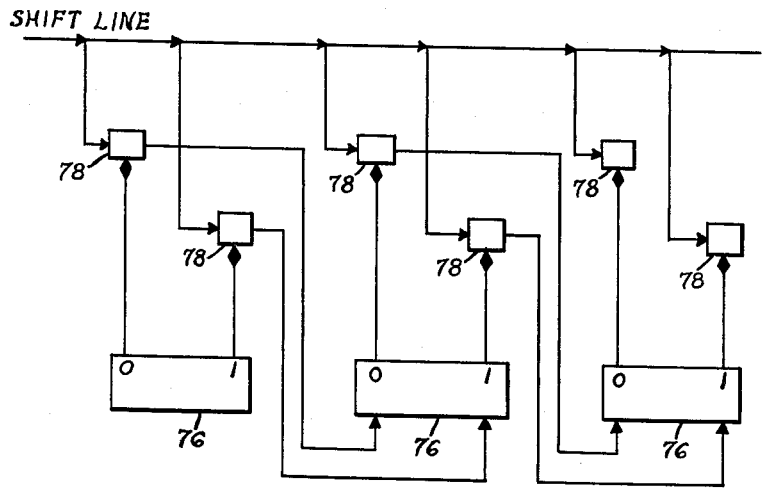
FIG. 8 shows the basic shift logic of the digital computer.

Referring to FIG. 11 the storage device 40 is shown in detailed form and employs the shifting and addition techniques incorporated in the logical diagrams of FIGS. 8, 9 and 10. The logic of FIG. 11 operates in conjunction with the main arithmetic elements 34 and 36 to perform floating point addition. Floating point addition is described on pages 20, 21 and 328 of Richards' book on "Arithmetic Operations in Digital Computers," published by Van Nostrand. This type of addition comprises the steps of comparing the exponents of the addend and the accumulator storage, then shifting the accumulator storage until the exponents of the accumulator storage and addend are the same and then performing parallel addition. The temporary storage device or accumulator 40 of FIG. 2 is shown on FIG. 11 as comprising the flip-flop 96. The associated A-register of FIG. 2 is shown on FIG. 11 as comprising the flip-flops 94. A shifting circuit of the type shown in FIG. 8 is shown on FIG. 11 as comprising the flip-flops 98. Gate circuits 100 operate in their usual manner and link the flip-flops 94 and 96 to the shifting flip-flops 98 to perform the necessary arithmetic operations. A sign check signal is applied to the gates connected to the output of the first accumulator flip-flop and operates to determine whether the exponent of the accumulator is larger or smaller than the exponent of the A-register. This will be explained in detail later. AND circuits 102 and OR circuits 104 operate, as do the gate circuits 100, to perform the usual arithmetic operation.

As has been earlier said, the logic of FIG. 11, i.e. elements 40 and 46 of FIG. 2, operates in conjunction with the main arithmetic elements 34 and 36 to perform floating point addition. A description of floating point arithmetic may be found in "Arithmetic Operations In Digital Computers," by R. K. Richards, D. Van Nostrand Co., Inc., 1955. In order to simplify the explanation of the operation of exponent order control shown in FIGURE 11, reference will be made to identical basic circuits found in the Richards book cited supra. The circuit shown in FIGURE 11 is utilized to compare the exponents of the numbers which are to be operated on in the main register shown in FIGURE 12. FIGURE 11 then is merely the logic circuitry for the exponents when the main register numbers are parallel added, using floating point addition. The exponent logic circuitry has eleven orders. These are shown in FIGURE 11 except for orders 1–6 which are shown as 94B, 96B, 100B, 102B and 104B because they are identical. The operation of orders 1–6 is identical to that given for FIGURE 4–14 of the Richards book cited supra. The seventh order, 94C, 96C, 98C, 100C, 102C and 104C operates in an identical fashion to the accumulator shown in FIGURE 4–16 of the Richards book cited supra, except that the carry storage of FIGURE 4–16 is utilized as a shift counter 98C. It was earlier said that when two numbers $A \times 2^m$ and $B \times 2^n$ are added together, the value of the exponents must be made equal. See Equation 1. Therefore, for easy understanding of the instant invention, consider all numbers as fractions times some power of 2. Also, all numbers resulting from arithmetic operations in the instant invention are stored using the left 11 bits as the coefficient and the right 11 bits as the exponent. In other words, the instant invention utilizes a 22 bit word having 11 bits of coefficient information and 11 bits of exponent information. Generally, when two numbers are to be added in the main arithmetic elements 34 and 36, the exponents of these numbers are placed in elements 40 and 46 to determine which exponent is larger and thus control shifting of the coefficient in the main arithmetic elements 34 and 36.

The add (AD) order will be used to illustrate the add type operation. The order AD X adds the contents of register X in the memory to the contents of the main accumulator 34. When this order is given the complement of the exponent of the number in the main accumulator 34 is placed in the temporary storage device 40. Also, the number from the register X in the memory 50 is placed in the main A-register 36. The exponent of this X-register number is also placed in the A-register 46 where it is added to the exponent already in the temporary storage device 40. If the result of the addition of the numbers in elements 40 and 46 is positive, the exponent from register X is the larger. If the result of this exponent addition is negative, the exponent in the main accumulator is larger. The difference between the two exponents is read into a shift counter comprising flip-flops 98. This shift counter controls the number of shifts of the smaller number in the main accumulator 34 or the main A-register 36. The shifting of the smaller number is always to the right. When the two exponents are equal, the two coefficients can then be added as previously described. Inasmuch as the sign of the number in element 40, i.e. flip-flops 96, is used to determine which exponent is the larger, a sign check signal is applied to the first flip-flop 96 in the accumulator 40 to determine whether a Zero or a One is present in this flip-flop. The presence of a One indicates a negative sign; the presence of a Zero indicates a positive sign. For exemplary purposes, the presence of a Zero at the output of the first flip-flop 96 of accumulator 40 would indicate that the sum of the two exponents produced a positive number. As will be clearly shown later, the presence of a positive output from flip-flop 96 means that the exponent in the main A-register 36 is larger than the exponent in the main accumulator 34. This being the case, the gate 100 receiving the sign check signal generates an output which operates to clear the accumulator exponent bits.

The program timing for all orders including the add order is given in Table III.

*Table III*

| Time Pulse | Function |
|---|---|
| 1 | MAR Clear. |
| 1.5 | {PC Read Out. {MAR Read in. |
| 2.0 3.0 | Core Memory Read. CS Clear. |
| 4.0 | {MBR Read Out. {CS Read in. |
| 5.0 | The order. |
| 6.0 | Add to PC. |

Notice that on time pulse 4 the order part of the instruction is read into the controls switch 52 from the memory buffer register 48. Hence the order itself actually starts at time pulse 5.

The actual mechanics of handling the exponent in the add order is shown by the add operation timing depicted in the Table IV.

*Table IV*

| Time Pulse | Function |
|---|---|
| 5 | A-Reg. 36 Clear; A-Reg. 46 Clear. |
| 6 | |
| 7 | Acc 40 Clear. |
| 7.5 | MAR 54 Clear. |
| 8 | {MBR 48 Read Out; Acc 34 Read Out. {MAR 54 Read In; A-Reg. 46 Read In (Rt. 11 bits). |
| 8.5 | Core Memory 50 Read; Acc 40 and A-Reg. 46 Subtract. |
| 9 | A-Reg. 46 Clear, Shift Counter Clear. |
| 10 | {MBR 48 Read Out; A-Reg. 36, Read In (Rg. 11 bits). {A-Reg. 46 Read In. |
| 10.5 | Acc 40 and A-Reg. 46 Add. |
| 11 | Acc 40 and A-Reg. 46 Carry. |
| 12 | Acc 40 and A-Reg. 46 Sign Check. |
| 12.5 | Shift Counter Read In. |
| 13 | Set Add shift flip-flop—shift once. |
| 14 15.0 | Add Shift FF Conditional Clear. |
| 15.5 | Accumulator 34 Add. |
| 16.0 | Acc 34 Carry. |
| 1 | Check for overflow. |

The use of this table should be in conjunction with FIG. 11.

To execute the add instruction, AD X the complement of the exponent of the number in the main accumulator 34 (right 11 bits) is placed in the accumulator 40 via the A-register 46. The method and structure for obtaining complements is well known in the art and is therefore not further explained. A typical diagram for obtaining complements is shown in FIGURE 4–29 of the Richards book. Then the contents of register X in the memory 50 are placed in the main A-register 36, and the exponent which is contained in the right eleven bits of that number is also placed in the A-register 46. The difference between the two exponents is then obtained by adding the exponent in the A-register 46 to the complement of the exponent in the accumulator 40. If the result of the addition is negative, the number in the accumulator 40 is the larger. Therefore, the right A-register 36, i.e. the part of the A-register containing the exponent, is cleared and all bits except the sign bits of the accumulator 40 are complemented to put the absolute magnitude of the exponent difference in the accumulator 40. If the difference between the exponents is positive the number in the A-register 46 is larger and, therefore, the right accumulator 34 is cleared. In each case, the smaller exponent is cleared because after the shifting to make the exponents equal, the sum of the two numbers will have the exponent of the larger number (or its exponent plus 1 which is explained later). The ones complement of the magnitude of the difference between the exponents is read into the shift counter flip-flops 98. If the difference magnitude is 10 or greater, the smaller of the two numbers is cleared and the shifting not completed because the smaller number is less than the least significant bit of the larger number. A pulse applied on line 112 tests the last flip-flop 96 to see if the number of shifts is odd. If this flip-flop 96 is on a One, the smaller number in the main accumulator, is shifted right once. Then two megacycle clock pulses go through the one-side gate of the add shift flip-flop 108, add one to the counter flip-flops 98, and thus cause the smaller number in either the main A-register 36 or the main accumulator 34 to be shifted right at twice the normal rate. The left accumulator shift right 2, the left A-register shift right 2, the left accumulator shift right 1, and the left A-register shift right 1 are respectively taken from output lines 114, 116, 118 and 120 and are applied to the appropriate main elements 34 or 36. Then with the exponents of the two numbers equal, the numbers are added and the carries propagated. If there is an overflow the sum is shifted right and the exponent increased by one. After each arithmetic operation the coefficient is shifted until the most significant bit becomes a One which in effect places the value of the coefficient between 1 and ½. The number of shifts required are added to or subtracted from the exponent. Such a scheme insures the retention of the most significant bits possible with a finite word length.

Floating point multiplication in the instant invention is accomplished in a similar manner. Since all coefficients are between ½ and 1, the result of multiplying two coefficients is between ¼ and 1. The exponent of the resulting number is the sum of the exponents of the two numbers. See Equation 6.

$$(A \cdot 2^n)(B \cdot 2^m) = C \cdot 2^{m+n} \qquad (6)$$

wherein $\frac{1}{4} \leq C < 1$. After the multiplication is complete, the most significant bit is tested and if it is a zero the answer is shifted left once and the exponent reduced by one. All coefficients are made positive before the actual multiply starts and the answer is given the proper sign after all other functions are complete.

The instant inventive method of multiplying utilizes the equipment already needed for adding and is shown in the logical diagram FIGS. 12a and 12b.

To best understand the instant inventive method of multiplying, the better known multiplying method of shifting and adding $n$ times will be explained first. Given two numbers $$A = 13 = 01101$$
$$B = 15 = 01111$$

where the first binary bit is the sign bit, the multiplication formed by the successive additions to and shifts of the partial product would proceed as follows:

```
              B  01111
              A  01101
Partial Product  01111            add B                         (1)
Partial Product  00111  1         shift partial product right   (2)
Partial Product  00111  1         add and carry not done        (3)
Partial Product  00011  11        shift partial product right   (4)
Partial Product  10010  11        add B and carry               (5)
Partial Product  01001  011       shift partial product right   (6)
Partial Product  11000  011       add B and carry               (7)
Product          01100  0011      shift partial product right   (8)
```

The answer 011, 000, 011 is the binary equivalent of 195 which equals 15×13. Notice that the third step, the second bit of a A is a zero and 0×B=0 so nothing was actually added at this step. With the add logic already described, it takes 2 clock pulses to add and carry. Since the carry may have to propagate the whole length of the accumulator, enough time must be allowed between pulses to allow the carry pulse to get through the cascaded delays of all the gates and to allow the last flip-flop to settle down after being complemented. The carry propagation times and the flip-flop settling time are about the same. Rather than resort to complicated schemes for reducing the carry propagation time, the instant invention eliminates the carry. This means fewer steps necessary to multiply and the pulse repetition rate may be twice as fast as when the carry is propagated, thus reducing the time required to multiply.

To accomplish multiplication without carry propagation, a carry storage register is used in the instant invention to store the carries and to help control the shift. Such a register is shown in FIG. 11.

Multiply without carry is as follows:

```
B  01111
A  01101
   01111            add B
   00111  1         shift partial product
   00111  1         add is not done, 2nd bit of A is Zero
   00011  11        shift partial product
   01100  11        add B
   00110            carry storage after add
   00101  011       shift partial product
   00100            carry storage after shift
   01010  011       add B
   01110            carry storage after add
   00010  0011      shift partial product
   01010            carry storage after shift
   01100  0011      answer after propagating carries
```

Referring to the tabulation, the add pulse gives the partial sum and stores the carries in the carry register. The shift right pulse does not shift all the bits in the same fashion. If the carry register contains a One at a given position, the complement of that position is shifted right. This is because if the carry were propagated it would have complemented that bit. If the bit being shifted is a One, and the corresponding carry is a One, then the carry bit is left a One. If the bit being shifted is a Zero and the corresponding carry is a One, then the carry bit is not left as a One but reverts to Zero. The carry is not erased because if the carry had been propagated, the complementing of the partial sum bit from a One into a Zero would have produced a carry to the next stage. Shifting the number right and holding the carries still is equivalent to holding the number still and propagating the carry one position to the left. When the partial sum bit is Zero, complementing it to a One does not produce another carry, as was previously explained. Therefore, shifting a Zero as a One when a carry is present requires the clearing (putting on Zero) of that carry bit. There is no possibility of a carry bit that is not cleared receiving another carry bit because after the shift a One in the carry bit means that there is a Zero in the partial sum one bit to the right. A Zero and a One from the next add can produce a carry. After $n$ shifts, where $n$ is the length of the number being multiplied, there may be some Ones left in the carry register. The last step is to propagate these remaining carries. Thus the method of multiplying illustrated in the above tabulation requires only one carry propagation instead of $n$ carry propagations.

When two numbers of $n$ bits each are multiplied together, the answer will not be more than $2n$ bits long. Since all stored numbers with the coefficient between one-half and one, the product of two $n$ bit numbers will be $2n$ or $2n-1$ bits. The values of quantities are only known to about nine bits accuracy though the numbers are stored to 11 bits. Very little could be gained by having the multiplier produce the least 10 significant bits of a multiplication. Therefore, provision is not made to store the ten least significant bits as they are shifted out of the accumulator. Even if all the bits are Ones, their value is less than the value of the least significant bit retained. The least significant bit retained after the multiplier is used to round off the product in the left 11 bits. If the least significant bit retained is a One, one is added to the left 11 bits and if the least significant retained bit is a Zero, nothing is done. With this system of round-off, the errors due to round-off tend to cancel each other.

The instant invention as previously stated has been designed to specifically solve aerodynamic equations. To solve these aerodynamic equations the instant inventive digital computer must be able to add, subtract, multiply, and divide two numbers. In addition this computer must have a rapid access memory which stores the necessary program and system data.

The word "program" is here used to mean the sequence of instructions necessary for the computer to perform a set of operations such as solving an equation. As previously described, the memory is composed of a number of registers, each of which contains a word. A word may either be a number or one of the instructions of the program. The computer has an accumulator which is part of the arithmetic element. After each arithmetic operation on two numbers, the result is stored in the accumulator.

As a start, the following computer orders are assumed.

| Order | Abbreviation | Explanation |
|---|---|---|
| Clear and add $x$ | CA$x$ | Clear the accumulator 34 and then add the contents of register $x$ to the accumulator. |
| Add $x$ | AD$x$ | Add the contents of register X to the contents of the accumulator 34. |
| Multiply $x$ | MU$x$ | Multiply the contents of the accumulator 34 by the contents of register $x$. |
| Transfer $x$ | TS$x$ | Transfer the contents of the accumulator 34 to register $x$ leaving the accumulator 34 unchanged. |

Now suppose it is desired to evaluate Equation 7, $$f = AB + CD + EF + GH \quad (7)$$

Defining the symbol /R/O to mean the register containing O the prior art program to evaluate $f$ might be as follows:

| | Accumulator | Register $f$ |
|---|---|---|
| CA/R/A | A | |
| MU/R/B | AB | |
| TS$f$ | AB | AB |
| CA/R/C | C | AB |
| MU/R/D | CD | AB |
| AD$f$ | AB+CD | AB |
| TS$f$ | AB+CD | AB+CD |
| CA/R/E | E | AB+CD |
| MU/R/F | EF | AB+CD |
| AD$f$ | AB+CD+EF | AB+CD |
| TS$f$ | AB+CD+EF | AB+CD+EF |
| CA/R/G | G | AB+CD+EF |
| MU/R/H | GH | AB+CD+EF |
| AD$f$ | AB+CD+EF+GH | AB+CD+EF |
| TS$f$ | AB+CD+EF+GH | AB+CD+EF+GH |

A typical aerodynamic equation is the yaw Equation 8.

$$\dot{r} = \frac{pV^2Sb}{2I_{xx}}C_n(Ba) + \frac{pV^2Sb}{2I_{zz}}C_{n_{dA}}(a) \cdot dA + \frac{pV^2Sb}{2I_{zz}}C_{n_{dR}} \cdot dR$$
$$+ \frac{pVSb^2}{4I_{zz}}C_{n_P}(a) \cdot P + \frac{pVSb^2}{4I_{zz}}C_{n_r} \cdot r - \frac{I_{xx}}{I_{zz}}\dot{P} - \frac{I_{yy} - I_{xx}}{I_{zz}}pq \quad (8)$$

Since the solution of the typical aerodynamic equations involves many programs similar to that given for evaluating $f$, an inventive simplification of the program used to find $f$ was developed. Shortening of the program means faster computation, which in turn makes it possible for more complicated systems to be simulated in real time. Therefore a second accumulator 38 and A-register 44 is incorporated in the computer shown in FIG. 2. This accumulator 38 stores the results of its own arithmetic operations. The following two orders therefore are added to the order code previously given.

| Order | Abbreviation | Explanation |
|---|---|---|
| Clear, add and transfer $x$ | CT$x$ | Add the contents of the accumulator 34 to the contents of accumulator 38, clear the accumulator 34 and place the contents of register $x$ in the accumulator. |
| Add and transfer $x$ | AT$x$ | Add the contents of accumulator 38 to the contents of the accumulator 34 and place the result in register $x$ and then clear accumulator 38. |

The order "clear and add $x$" now clears accumulator 38 in addition to placing the contents of register $x$ in the accumulator 34. With the aid of the accumulator 38, the function $f$ may be evaluated as follows:

CA/R/A, MU/R/B, CT/R/C, MU/R/D, CT/R/E, MU/R/F, CT/R/G, MU/R/H, AT$f$

Thus with accumulator 38 and the new orders, $f$ may be evaluated with nine instructions instead of fifteen instructions, a saving in time of 40 percent.

Below some more orders are defined. They are arithmetic type operations needed to solve aerodynamic equations.

| Order | Abbreviation | Explanation |
|---|---|---|
| Clear and subtract $x$ | CS$x$ | Clear the accumulators 34 and 38 and then place the negative of the contents of register $x$ in the accumulator 34. |
| Substract $x$ | SU$x$ | Substract the contents of register $x$ from the contents of the accumulator 34. |
| Clear, subtract and transfer $x$. | ST$x$ | Subtract the contents of the accumulator 34 from the contents of 38, clear the accumulator 34 and place the contents of register $x$ in the accumulator 34. |
| Divide $x$ | DV$x$ | Divide the contents of the accumulator 34 by the contents of register $x$. |
| Record $n$ | RC$n$ | Put the contents of the accumulator 34 in the output device numbered $n$. |
| Jump $x$ | JU$x$ | Take the next instruction from register $x$ and continue the program from there. The right 12 bits of the A-Register 36 will contain the memory location of JU$x$ plus one. |
| Jump if negative $x$ | JN$x$ | Same as JU$x$, but performed only if the accumulator 34 is negative. The right 12 bits of the A-Register 36 will contain the memory location of JN$x$ plus one. |
| Transfer Address | TA$x$ | Place the right 12 bits of the A-Register 36 into the right 12 bits of register $x$. The order is normally used after a JU$x$ or a JN$x$. |
| Transfer Digits | TD$x$ | Place the right 12 bits of the accumulator 34 into the right 12 bits of register $x$. |
| Read $m$ | RD$m$ | Place the encoded value of item $m$ in the accumulator 34. |

With the order code thus established, fast programs to solve aerodynamic equations are possible.

One of the more important features of complex physical systems such as operational flight trainers is their non-linearity. If a simulator is to be generally useful it must incorporate some method of non-linear function generation. Present analog techniques of function generation are inflexible and are not readily adaptable to functions of two or more variables. Therefore, the instant invention incorporates digital facilities for the generation of arbitrary functions of two variables.

Generally, the instant inventive method of generating a function of one or more variables is accomplished by storing discrete values of the function in the core memory 50 and performing linear interpolation to obtain an approximation to the given function. The discrete values of the function will be read out of the core memory 50 and the arithmetic elements 34, 36, 38, 40, 42, 44 and 46 will then be used in the usual manner to perform the interpolation.

The problem of selecting and reading out discrete values of an arbitrary function of two variables is now discussed. FIG. 13 illustrates a typical function of two variables and also presents a notation that will be used. Assume that X lies between $X_i$ and $X_{i+1}$, and that Y lies between $Y_j$ and $Y_{j+1}$. The linear interpolation equations are $$Z_{j+1} = Z_{j+1,i} + (x-x_i)\frac{Z_{j+1,i+1}-Z_{j+1,i}}{X_{i+1}-X_i} \quad (9)$$

$$Z_j = Z_{ji} + (x-x_i)\frac{Z_{j,i+1}-Z_{ji}}{X_{i+1}-X_i} \quad (10)$$

$$Z = Z_j + (y-y_j)\frac{Z_{j+1}-Z_j}{Y_{j+1}-Y_j} \quad (11)$$

Given the discrete values of a function $Z(x, y)$ which describe said function in the manner illustrated in FIG. 13 and the values of the independent variables $x$ and $y$, the problem is to find the corresponding value of Z. FIG. 14 shows the four discrete values of Z that must be selected and read out of the memory 50 in order to carry out the interpolation procedure that produces the value of the function Z.

To reduce the computation that must be done in real time when evaluating Z, the values of $x_{i+1}-x_i$ and $y_{j+1}-y_j$ are suitable scale factoring, made equal to one. In particular, this convention eliminates division during the interpolation routine. Each interpolation is done as one order, reducing the total number of memory accesses from what would be required if the interpolation were done as a series of orders.

The address in memory of a data point, such as $z_{ji}$, is found as follows. The particular function being generated specifies, say the left four bits of the address. The integral part of the independent variable $x$ (the part of $x$ to the left of the decimal point) specifies, say, the middle four bits of the address. The integral part of the independent variable $y$ specifies, say, the right four bits of the address. The fractional parts of $x$ and $y$ (the parts to the right of the decimal point), correspond respectively to $x-x_i$ and $y-y_j$, both of which are needed in the interpolation computation. The fractional parts of $x$ and $y$ are stored in the temporary registers 42 and 40. The general approach used in the instant invention is to stop the regular computer clock and to use a special step counter to control function generation. The steps taken to interpolate are as follows:

Obtain $Z_{j,i}$ from the memory 50 and put it in the A-register 46 and its complement into the main accumulator 34.

Obtain $Z_{j,i+1}$ from the memory 50 and add to $-Z_{j,i}$.
Multiply by $(X-X_1)$.
Add $Z_{j,i}$ to get $Z_j$.
Place the result, $Z_j$ in the storage device 38.
Obtain $Z_{j+1,i-1}$ from the memory 50 and place it in the accumulator 34.
Obtain $Z_{j+1,i}$ from the memory 50 and place it in the A-register 46 and also subtract it from $Z_{j+1,i+1}$ in the main accumulator 34.
Multiply the result in the main accumulator 34 by $(X-X_1)$.
Add $Z_{j+1,i}$ to the contents in the main accumulator 34 to get $Z_{j+1}$.
Subtract $Z_j$ stored in the storage device 38 from $Z_{j+1}$ in the main accumulator 34.

Multiply the contents in the main accumulator 34 by $(Y-Y_j)$.
Add $Z_j$ to the contents of the accumulator 34 to get Z.
The actual interpolate routine requires five memory accesses including one to get the order itself from memory.

Obviously many modifications and variations of the present invention are possible in the light of the above teachings. It is therefore to be understood that within the scope of the appended claims the invention may be practiced otherwise than specifically described.

We claim:
1. An analog-digital special purpose computer containing the combination of digital computer means which comprises memory means for storing all digital information, a memory buffer register operatively connected to send memory means for storing the word read in or out of said memory means, memory address register means connected to said memory means for control of the addresses within said memory means, program counter register means connected to said memory means and containing the address of the order to be performed, control switch means connected to the output of said memory means for decoding the order part of an instruction, input and output register means connected to said memory means for placing digital signals and taking them out of said memory means, arithmetic means comprising a main accumulator and A-register means operatively connected to said memory means, a first storage means operatively connected to said memory means and said arithmetic means, and a second-storage means operatively connected to said arithmetic means and said memory means, said first and second storage means facilitating rapid interpolation and floating point computations by changing the scale of the digital computation in an analog fashion, analog computer means, analog-digital encoder and decoder means operatively inter-connected between the control switch means of said digital computer means and said analog computer means whereby said control switch means controls the operation of said analog computer means, said analog computer means comprising analog arithmetic means, analog storage means operatively connected to said analog arithmetic means, integrating means connected to the output of said analog storage means and gate circuit means inter-connecting said digital computer input and output and said analog computer input and output whereby said digital and analog computer combination form a high speed computer.

2. The combination of claim 1 wherein said digital memory means comprise a magnetic core memory.

References Cited in the file of this patent

UNITED STATES PATENTS

| | | |
|---|---|---|
| 2,538,636 | Williams | Jan. 16, 1951 |
| 2,544,126 | Baldwin | Mar. 6, 1951 |
| 2,679,356 | Briers | May 25, 1954 |
| 2,865,564 | Kaiser et al. | Dec. 23, 1958 |
| 2,916,209 | Adamson et al. | Dec. 8, 1959 |
| 2,925,220 | Serrell | Feb. 16, 1960 |
| 2,933,249 | Scuitto | Apr. 19, 1960 |
| 2,969,522 | Crosby | Jan. 24, 1961 |
| 2,992,522 | Adams et al. | July 11, 1961 |
| 2,995,302 | Ingwerson et al. | Aug. 8, 1961 |

FOREIGN PATENTS

| | | |
|---|---|---|
| 749,633 | Great Britain | May 7, 1958 |